United States Patent [19]

Stacy, Jr.

[11] 4,453,611
[45] Jun. 12, 1984

[54] TERRAIN VEHICLE HAVING A SINGLE, LATTERALLY BENDABLE TRACK

[76] Inventor: Jack C. Stacy, Jr., Rte. 3, Box 107A, Santa Fe, N. Mex. 87501

[21] Appl. No.: 195,754

[22] Filed: Oct. 10, 1980

[51] Int. Cl.³ .............................................. B62D 11/20
[52] U.S. Cl. ..................................... 180/9.44; 305/44; 305/57
[58] Field of Search ................ 180/9.44, 9.46, 9.24 A, 180/9.2 R; 305/44, 57

[56] References Cited

U.S. PATENT DOCUMENTS

| | | | |
|---|---|---|---|
| 789,874 | 5/1905 | Owen | 180/9.44 |
| 1,219,637 | 3/1917 | Hackney et al. | 180/9.44 |
| 1,286,836 | 12/1918 | Tesluk | 305/44 |
| 2,393,368 | 1/1946 | Hait | 305/44 |
| 2,599,233 | 6/1952 | Christie | 305/57 |
| 3,017,942 | 1/1962 | Gamaunt | 180/9.2 R |
| 3,548,962 | 12/1970 | Best | 180/9.44 |
| 3,565,198 | 2/1971 | Ames | 180/9.44 |
| 3,934,943 | 1/1976 | Gage | 180/9.44 |
| 3,938,607 | 2/1976 | Pohjola | 180/9.44 |

FOREIGN PATENT DOCUMENTS

636257 4/1928 France .................................. 305/57

Primary Examiner—Joseph F. Peters, Jr.
Assistant Examiner—Donn McGiehan
Attorney, Agent, or Firm—James E. Snead

[57] ABSTRACT

An all terrain vehicle having a narrow, single, endless track centrally located and guided about a plurality of wheels which support the vehicle main body. The vehicle main body is comprised of a plurality of body sections, each pivotally connected to one another in series relationship to enable each of the body sections to be laterally bent along the longitudinal axis of the vehicle. A wheel is suspended from each body section and is captured by the track so that when the vehicle is laterally bent along the longitudinal axis thereof, the endless track is likewise laterally bent, thereby causing the vehicle to change the direction of its course. The track is made from a plurality of series connected cleats. The cleats are made of two pivoted members which admit the endless track to bend concurrently with the pivoting of the body sections. A steering mechanism comprised of diagonal linkages cause each of the body sections to simultaneously move in a pivotal manner.

11 Claims, 19 Drawing Figures

TERRAIN VEHICLE HAVING A SINGLE, LATTERALLY BENDABLE TRACK

BACKGROUND OF THE INVENTION

A single track crawler type vehicle is known in the prior art as evidenced by H. E. Best, U.S. Pat. No. 3,548,962. Pohjola, U.S. Pat. No. 3,938,607 also proposes the provision of an endless track supported between rollers for use on a vehicle. The track envisioned in this and other prior art patents usually are extremely wide and therefore considerable difficulty is encountered whenever the vehicle attempts to change the direction of its course.

The patents Ames U.S. Pat. No. 3,565,198 and Hackney U.S. Pat. No. 1,219,637 are examples of multitrack vehicles wherein the main body of the vehicle is bent laterally so as to induce a corresponding lateral bend into the dual track, thereby providing a degree of control over the direction in which the vehicle is headed.

An overland track vehicle which can be used for traversing snow, sand, wet or marshy land, or dry land, and which has a single, continuous, flexible track for supporting the vehicle as it moves across the terrain is highly desirable because maximum efficiency is realized when the number of working parts have been reduced to a minimum. Moreover, such a vehicle presents the very smallest cross sectional area possible in this type of design. Furthermore, a vehicle of this design has a minimum weight and accordingly, the pressure of the foot print is extremely low and therefore requires a very small track area. Moreover, a single track vehicle inherently responds much better to direction change as compared to a multi-track vehicle having tracks bendable latterally from the direction of travel.

Improvements in a single track vehicle which overcome the above defects of the prior art and which achieve the above discussed goals are the subject of the present invention.

SUMMARY OF THE PRESENT INVENTION

The present invention comprehends a single track crawler type vehicle having a main body made up of a plurality of series connected body sections which are pivotally connected to permit movement in a horizontal plane respective to one another. The main body is suspended from a continuous flexible track means by a plurality of wheels, with there being one wheel for each body section.

A steering means is provided by which each body section simultaneously moves respective to another body section to thereby cause the main body to be laterally bent respective to longitudinal axis thereof. This action causes the suspension wheels to change from straight, aligned relationship into a segment of a circle, thus laterally bending the track and causing the vehicle to change direction of course.

The steering means generally includes linkage connected between alternate body sections and arranged to impart relative pivotal motion between adjacent body sections in proportion to the magnitude of turning moment induced into a pair of adjacent body sections.

Specifically, the steering means includes a handle bar means for turning a pivot shaft which moves a lever arm arranged laterally respective to the vehicle. The lever arm moves a linkage which causes two adjacent body sections to be pivoted respective to one another. A diagonal linkage interconnects alternate ones of the body sections which make up the main body, so that movement of the handle bars concurrently imparts pivotal motion into each of the body sections.

The track means is made of a plurality of cleats series connected together. Each individual cleat comprises co-acting male and female members having adjacent marginal ends telescoped together in a pivotal manner so that the individual cleats have limited lateral movement respective to one another, and thereby enable the vehicle track to be laterally bendable, while at the same time, the cleats are connected to one another in a manner which admits verticle pivotal movement therebetween as the individual cleats travel about the track supported by the wheels.

Each of the cletes are received in a guideable manner by a drive wheel which forces the track to move respective to the main body. A number of idler wheels together with the drive wheel support the track in underlying relationship respective to the vehicle.

A primary object of the present invention is the provision of improvements in a single track crawler type vehicle having a continuous flexible track laterally bendable to effect a change in direction of course.

Another object of the present invention is the provision of a single track crawler type vehicle having a main body made up of a plurality of series connected body sections which jointly cooperate together to present a longitudinally disposed vehicle, and which includes means by which the body sections are moveable laterally respective to one another.

Still aother object of the present invention is the provision of an endless track and wheel assemble for a crawler type vehicle having a single track, wherein the track has inwardly directed protrusions captured within the wheel assembly, and a series of lugs which enable the cleats to jointly form a chain which meshes with a centrally located sprocket of the wheel.

A still further object of the present invention is the provision of a laterally bendable track and vehicle combination wherein the vehicle body comprises a plurality of individual sections, each pivotally mounted respective to one another, and a steering means in which each of the sections simultaneously move in a pivotal manner respective to one another to thereby laterally bend the track and effect a change in direction of travel.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENT

Figure 1:
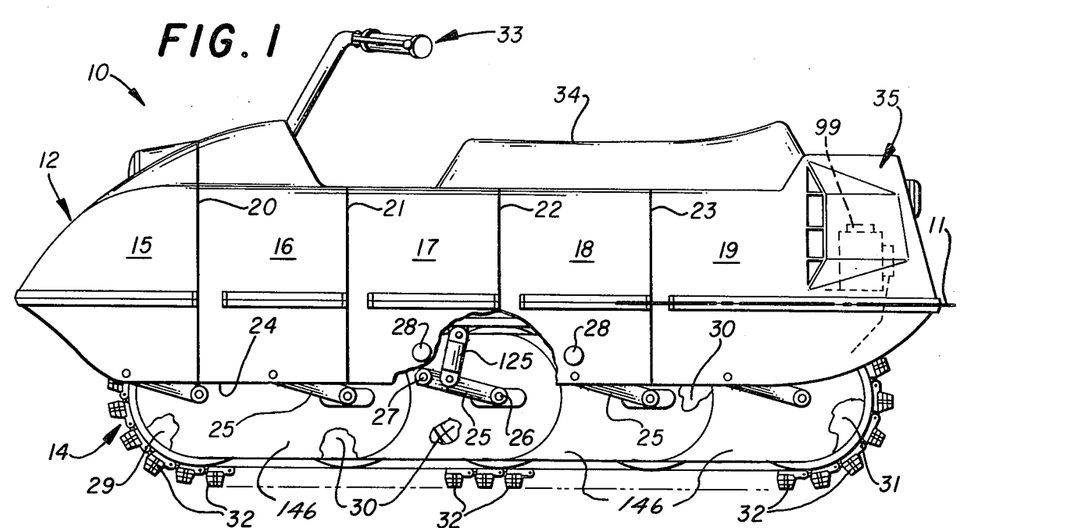
FIG. 1 is a side elevational view of a single track crawler type vehicle made in accordance with the present invention, with some parts being broken away therefrom in order to disclose additional details thereof.
Figures 2, 3:
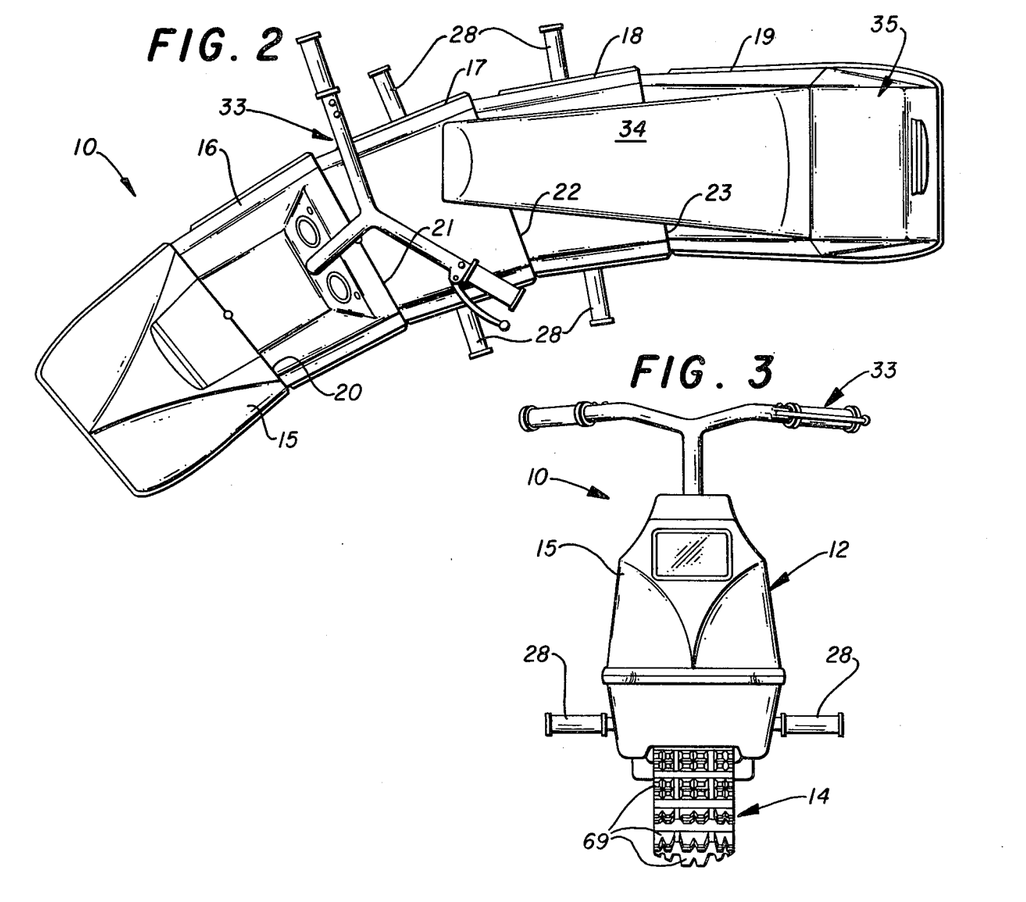
FIG. 2 is a top, plan view of the vehicle disclosed in FIG. 1.
FIG. 3 is a front view of the vehicle disclosed in FIGS. 1 and 2.

In the figures of the drawings, and in particular FIGS. 1–3, there is disclosed in all terrain, single track, crawler type vehicle 10 made in accordance with the present invention. The vehicle has a main body 12 supported from a single, narrow width track 14. The main body 12 has a longitudinal centerline 11, and is comprised of a plurality of body sections 15–19. Interface 20–23 is formed between body sections 15–19. The body sections each terminate at the longitudinally extending lower edge 24.

Pairs of tailing arm supports 25, each having a free end 26 and a pivoted end 27, are provided for each of the body sections. The pivoted end of arm 25 is attached to the vehicle body section 17, for example. Spaced apart foot rests 28 are located on opposed sides of the vehicle, and positioned to conveniently receive the driver and riders' feet. The vehicle includes a front track wheel 29, a plurality of intermediate wheels 30, and a rear drive wheel 31. Each of the wheels is sprung to the body by means of the before mentioned trailing arm assembly, such as seen at 25, for example. Arm 25 is sprung from the vehicle body by means of a spring loaded hydraulic shock assembly 125 of conventional design.

The endless track 14 is comprised of a plurality of series connected track cleats and shoes 32. A handle bar assembly 33 upwardly and rearwardly extends in a convenient manner from body section 16. An elongated, pliable, motorcycle-type seat 34 is attached to either of sections 18 or 19 and preferably accommodates two persons. A motor compartment 35 houses an internal combustion motor 99 of conventional design. The motor is connected to drive the drive wheel 31.

Figure 4:
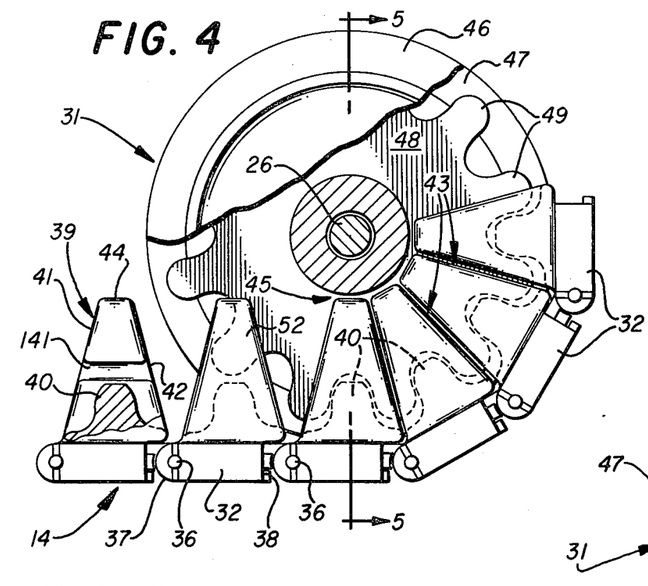
FIG. 4 is an enlarged, fragmented, detail of part of the apparatus seen disclosed in FIG. 1.

As best seen in FIG. 4, in conjunction with other figures of the drawings, the cleats 32 are series connected together by a through bolt 36. The through bolt interlocks the adjacent cleats to one another in series relationship, and permit the individual cleats to bend away from a horizontal plane so that an endless track is realized, as seen illustrated in the drawings. The nose 37, or forward end of the cleats, steps down on the ground in advance of the trailing end, or rear end 38, thereof. In FIG. 4, the shoes have been removed from the bottom of the cleats for clarity.

As seen in FIGS. 4–7, each of the cleats include spaced guides 39 and 52 which maintain the lateral alignment of the track respective to the longitudinally spaced apart wheels. A drive lug 40 is located between the guides 39 and 52. The lugs have a sloped wall, 41 and 42, which terminates at 44. The adjacent edges, 41 and 42, of the guides almost abut one another as indicated by numeral 43 as the cleats travel about the end wheels. The end 44 of the guide is slightly spaced from the wheel hub as indicated by the numeral 45.

Figure 5:
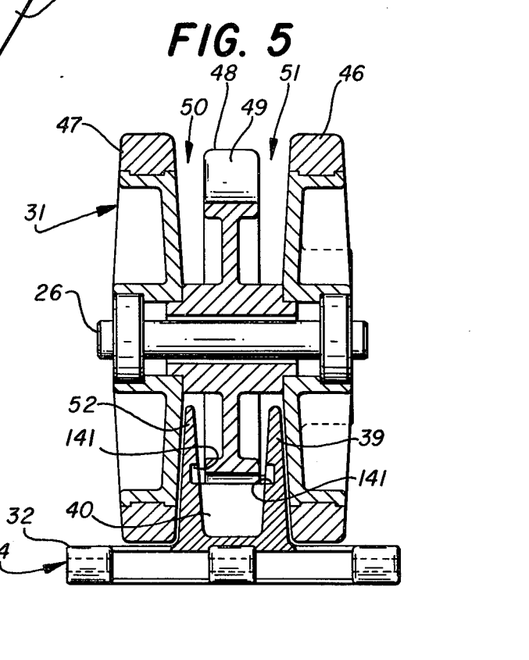
FIG. 5 is an enlarged, part cross-sectional view taken along line 5—5 of FIG. 4.
Figure 12:
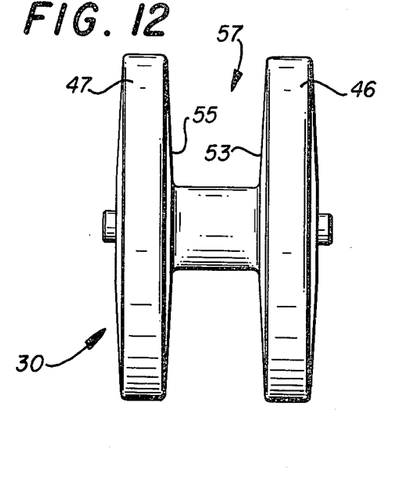
FIG. 12 is an end view of one of the wheels seen illustrated in FIG. 1 of the drawings.

As particularly seen in FIGS. 5 and 12, each of the wheels is provided with spaced rims at tires 46 and 47. The drive wheel includes a drive sprocket 48 located between rims 46 and 47. The drive sprocket includes a plurality of circumferentially extending drive teeth 49 which engages or receives the lug 40 located between members 39 and 52. Accordingly, spaces 50 and 51 are formed between the sprocket and rims for receiving the spaced guides of the cleats therewithin.

Figure 6:
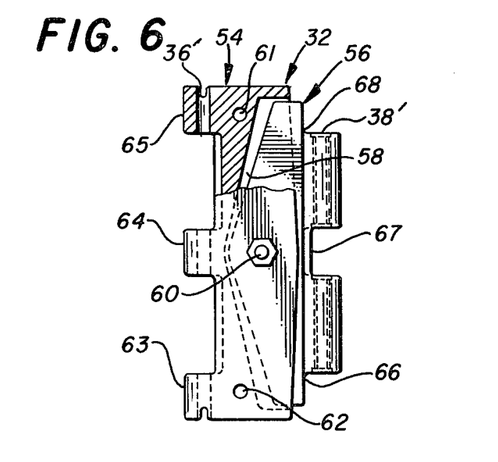
FIG. 6 is a bottom view of part of the apparatus disclosed in the foregoing figures.
Figure 7:
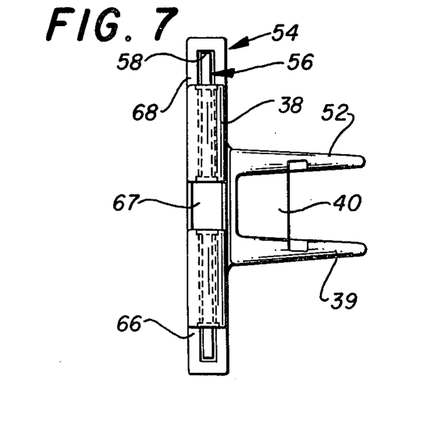
FIG. 7 is an end view of the apparatus seen in FIG. 6.

Looking now to the details of FIG. 6, in conjunction with FIGS. 5 and 7, it will be noted that the before mentioned cleats 32 is comprised of a female member 54 and a male member 56. Cavity 58 is formed within the female member and outwardly opens in a rearward direction. A portion of the forward end of the male member is telescopingly received within the cavity where the two members are pinned together by fastner 60. Fastner 60 enables pivotal movement in a horizontal plane to occur between the male and female members, and additionally provides a means by which the shoe can be attached to the cleat. Appertures 61 and 62 provide additional attachment means by which the shoe is affixed to the cleat. The shoe and clete could be formed in a unitary piece if desired.

Forwardly disposed hinge lugs 63, 64 and 65 provide spaced apart slots within which the lugs of adjacent cleats are received. Cutouts 66, 67 and 68 receive the corresponding lugs 63, 64 and 65 of an adjacent cleat. The before mentioned through bolt 36 is extended through the illustrated passageways 36', 38' of FIG. 6 for attaching adjacent cleats to one another.

Figure 8:
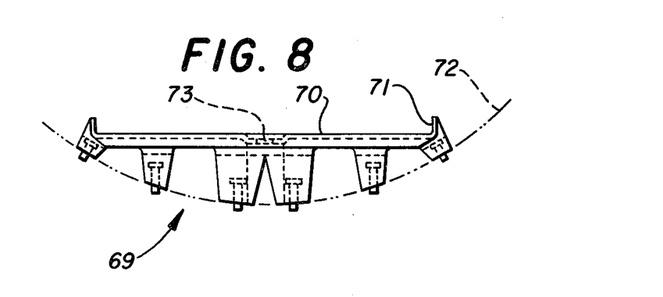
FIG. 8 is a rear view of part of the apparatus disclosed in FIG. 1.

FIG. 8 illustrates the preferred form of a cleat shoe 69. The shoe has a flat upper face 70 which terminates at opposed rails 71 which captures the shoe in indexed relationship respective to the cleat, and permits the shoe to be easily bolted into place. The outer face of the shoe has a radius of curvature 72. Apperture 73 receives the before mentioned fastner 60 therethrough.

Figures 9, 10:
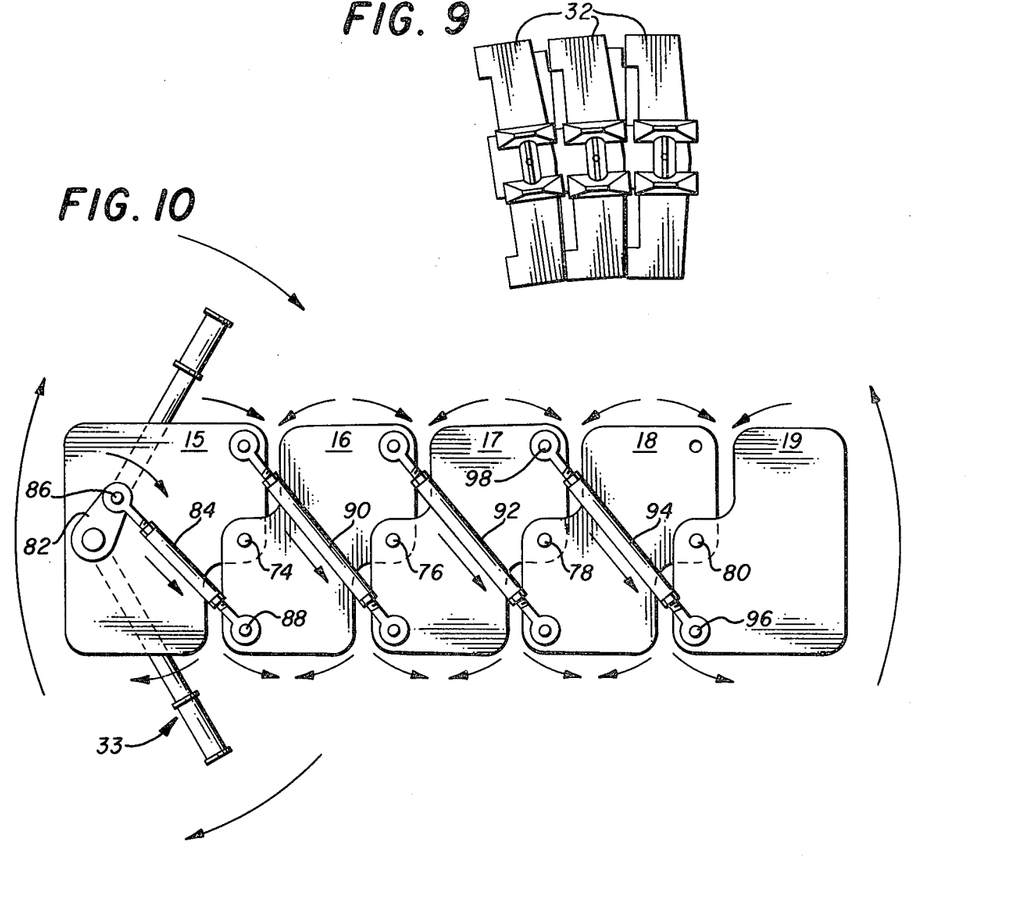
FIG. 9 is a top view of art of the apparatus disclosed in FIG. 1.
FIGS. 10 and 11 are schematical representations of alternate embodiments of steering apparatus used in conjunction with the present invention.

A schematical representation of the present vehicle is seen illustrated in FIG. 10, wherein it will be noted that body sections 15–19, respectively, are pinned together at 74, 76, 78, 80, respectively. Lever 82 is connected to the handle bar post. The free end of the lever is affixed to linkage 84 by means of journal 86, while the opposed end of the linkage is journaled to body member 16 by journal means 88. Hence, the steering means 33, 84 and 86 provides pivotal motion between the two body sections 15 and 16 in direct proportion to the manipulative action induced into the handle bars by the driver.

Member 15 and subadjacent member 17 are interconnected by a diagonal link 90. The diagonal link has opposed ends connected to alternate sides of the spaced apart body members. Subadjacent or alternate body members 16 and 18 are similarly interconnected by linkage 92, while subadjacent body members 17 and 19 are connected by linkage 94.

Each of the diagonal linkages 90, 92, and 94 have opposed ends 96 and 98 connected to alternate sides of the subadjacent or alternate body members.

Figure 11:
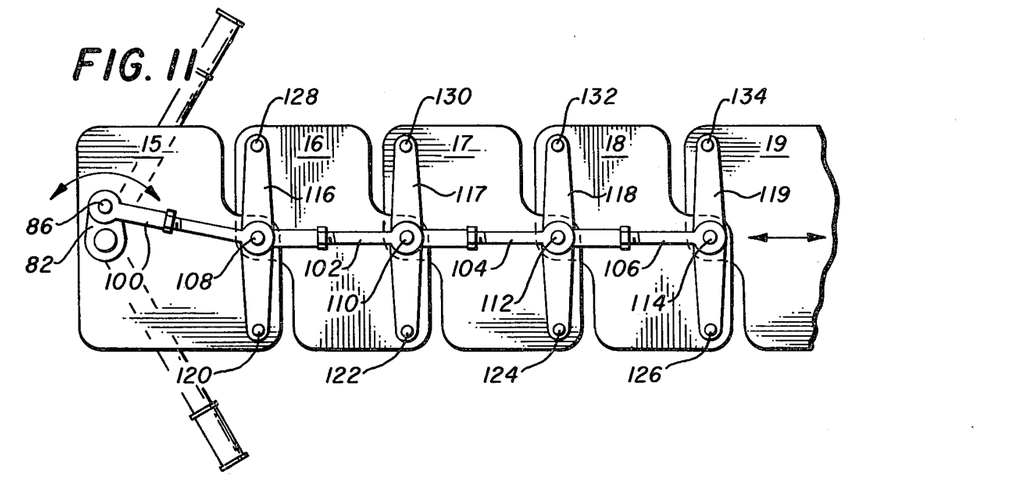

In the steering means illustrated in FIG. 11, the linkage 82 is connected to the handle bar post and has a free end journaled at 86 to push-pull linkage 100. Other push-pull linkages 102, 104, and 106 are series connected at the opposed journaled ends thereof. The adjacent journaled ends 108, 110, 112, and 114 share a common pivot pin. Each pivot pin pivotally connects adjacent body sections together.

Horizontal cross bars 116, 117, 118, and 199 each have one journaled end 120, 122, 124, and 126, respectively, connected to a side of body section 15, 16, 17, 18, and 19, respectively; with the opposed end of the horizontal cross bars having the other ends 128, 130, 132, and 134, resectively, journaled to the other side of body section 16, 17, 18, and 19, respectively.

Oscillatory movement of the handle bar imparts rotary motion into linkage 82 which reciprocates the push-pull linkage 100, 102, 104, and 106. This action moves adjacent body sections in a pivotal manner respective to one another due to the action of the horizontal cross bars in conjunction with the pivot points 108, 110, 112, and 114 and the push-pull linkage.

Figure 13:
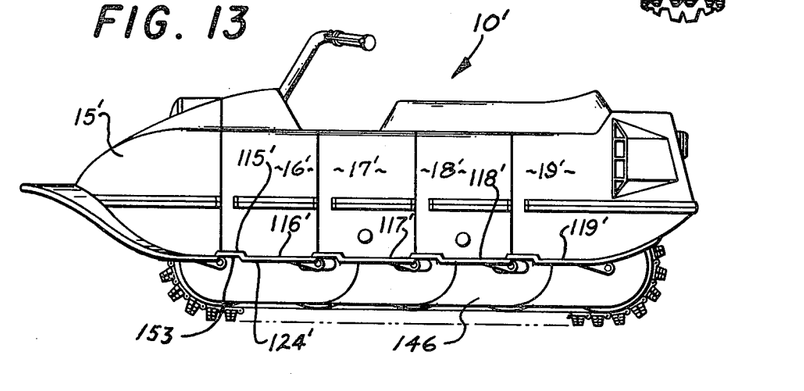
FIG. 13 is a side view of a modification of the vehicle seen in FIG. 1.
Figure 14:
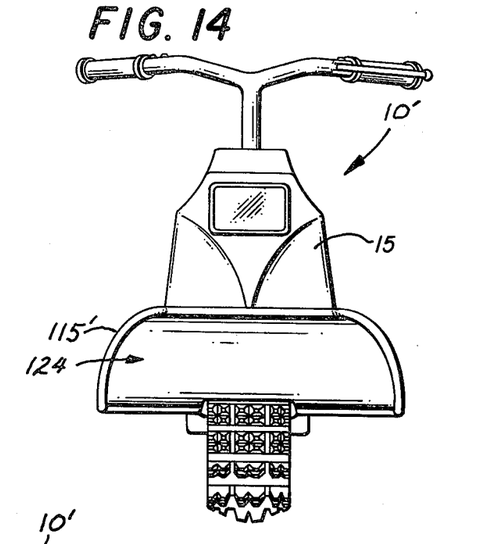
FIG. 14 is a front end view of the vehicle seen in FIG. 13.
Figure 15:
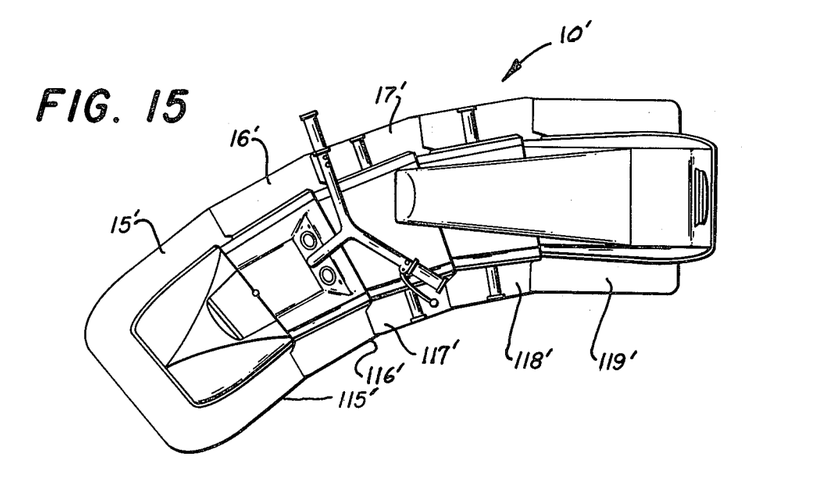
FIG. 15 is a top view of the vehicle seen in FIG. 14.
Figure 16:
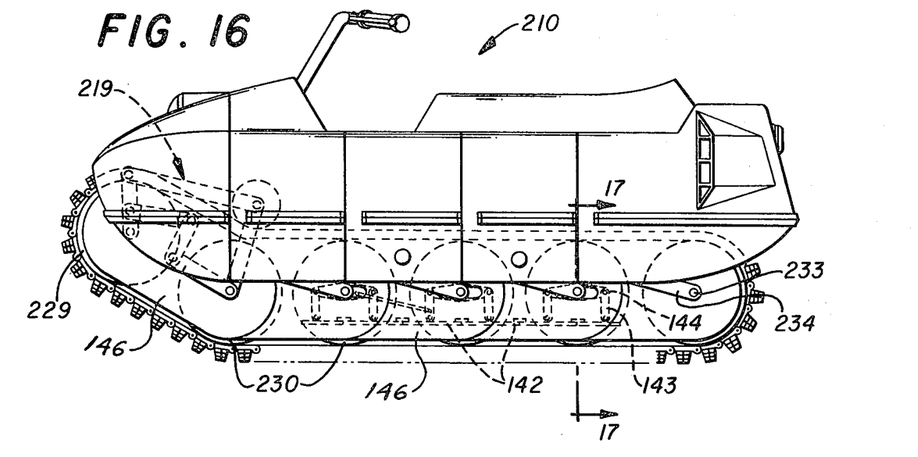
FIG. 16 is a part schematical, part diagrammatical, side view of a modification of the vehicle seen in FIGS. 1 and 13.

In the embodiment of the vehicle 10' disclosed in FIGS. 13-15, a skirt 124' is provided to add flotation in deep soft snow. The skirt 115' of the front body section 15' is upwardly curved as it projects forwardly of the vehicle. The skirt of the remaining body sections is comprised of laterally extending opposed segments 116', 117', 118', and 119', respectively, affixed to opposed sides of body sections 16', 17', 18', and 19', respectively. Each adjacent skirt segment overlaps one another in a slidable manner as indicated by numeral 153, with the trailing marginal edge of one segment underlying the leading marginal edge of an adjacent segment. The upper surface of the skirt provides a foot rest for the riders of the vehicle.

In the embodiment of the vehicle 210 disclosed in FIGS. 16-19, the front track wheel 229 is elevated respective to the intermediate track wheels 230, causing the ground engaging, or lower track run, to assume an upwardly inclined configuration at the forward marginal length thereof. The forward pair of wheels are linked together and sprung from the vehicle forward body section in the manner indicated by numeral 219. The remaining wheels are sprung from the vehicle body sections by a trailing arm assembly 235 which is attached to the wheel at 233.

Figure 17:
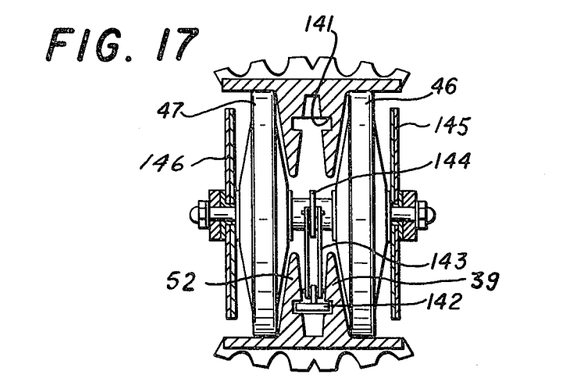
FIG. 17 is an enlarged cross-sectional view taken along line 17—17 of FIG. 16.
Figure 18:
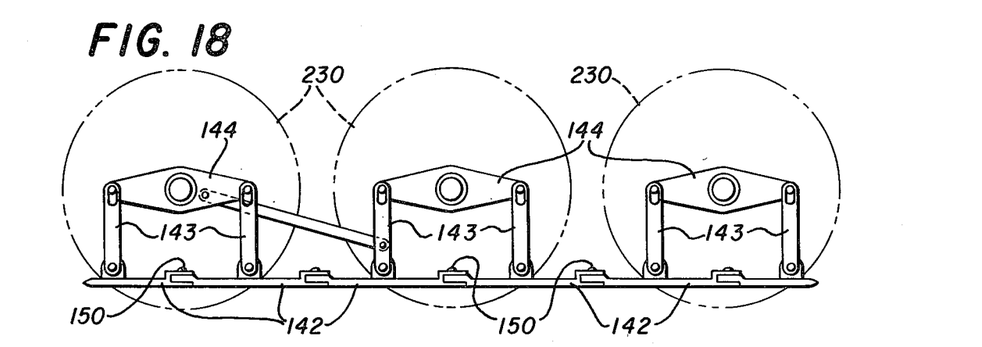
FIG. 18 is a diagrammatical, isolated side view of part of the apparatus seen disclosed in FIG. 17.
Figure 19:
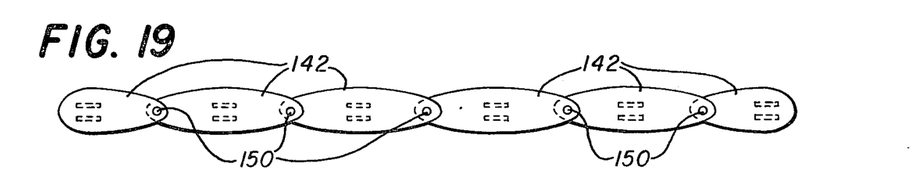
FIG. 19 is a bottom view of part of the apparatus seen in FIG. 18.

The lower track run is captured respective to the wheels by the track retaining system set forth in FIGS. 17-19 of the drawings. The system comprises an elongated retainer made of a plurality of vertical flexible plate members 142 pivotally attached together at 150 for bending in a horizontal plane. As seen illustrated in FIG. 16, the retainer preferably extends along a marginal length of the lower track run which is associated with those wheels which are located between the rear drive wheel and the forward pair of wheels.

As seen in FIG. 17, the retainer 142 is received within a longitudinally extending slot 141 formed on the opposed inside walls of the guides 39 and 52. As particularly seen in FIGS. 17 and 18, the retainer plates are provided with upwardly directed lugs which are pined to one end of pairs of spaced links 143. The other end of the links is pined to a cantilever arm 144, there being one arm affixed to each of the wheel axles which overlie the retainer.

As noted in FIG. 17, side skirt protectors 145 and 146 may be affixed outward of the wheels and tires 46, 47, if desired. These side protectors flex along with the wheel axle.

In operation, the driver is seated with his hands manipulating the steering handle bars 33, and with his feet resting on the forward pair of foot rests 28. A passenger may be seated rearwardly of the driver. The motor 99 is started and engaged with a suitable drive means for driving wheel 31. This action causes the endless track to more in captured relationship about the wheels 29-31, thereby propelling the vehicle along the ground.

In order to change direction of the course of the vehicle, the handle bars are manipulated in order to pivot two adjacent body sections 15, 16 about the vertical pivot pin 74. Relative pivotal motion between body section 15 and 16 simultaneously causes all of the remaining body sections to similarly pivot. This action bends the track laterally of the direction of travel, and in the manner of FIG. 9.

Each body section 15-19 has a wheel 29, 30 or 31 sprung therefrom, and accordingly, when the body sections are forced into the configuration illustrated in FIG. 2 of the drawings, the endless track assumes a similar bent configuration as seen illustrated in FIG. 9. This action causes the vehicle to change direction of course according to the radius of curvature of the bend.

The endless track is captured to the wheels by means of the opposed guide members which extend perpendicular to the track surface. The outer track surface bears against the inner peripheral surface of the spaced rims 46 and 47. The vehicle load is therefore transferred into the trailing arms 25, and by that means is therefore transferred into the wheels and then into the track, so that the footprint of the track supports the entire weight of the vehicle.

The present invention provides a single track, crawler vehicle which has a narrow width track; and, a vehicle having a minimum width. This enables unforseen advantages in the vehicle handling characteristics because of the greatly reduced pressure of the footprint of the track against the ground, together with unusual steering means set forth herein. The vehicle of the present invention is economical in operation, simple and rugged in construction, and is capable of traversing snow, sand, and muddy ground with great efficiency. The unusual amount of traction afforded by the single endless track and the steering mechanism makes the vehicle highly maneuverable, and enables it to negotiate very steep hills, and to safely travel across snow, sand and muddy ground which will not support a human being. The vehicle is exhilerating to ride and enables access to remote areas at all seasons of the year.

I claim:

1. A single track crawler vehicle comprising:
   a main body, said main body includes a plurality of series connected body sections which present a longitudinally disposed vehicle, means by which said body sections are individually pivoted respective to one another to laterally bend said main body;

a continuous, flexible track means; a plurality of wheels, there being a wheel for each said body section, means by which each said wheel supports part of said main body from said track means and a continuous track is thereby laid down for supporting said main body; means driving one of said wheels whereupon said continuous track means is moved, relative to said main body to propel the vehicle along the terrain;

said track means comprises a plurality of adjacent cleats having a forward and a rear end, said cleats are series connected into an endless said track means by connecting the forward end of one cleat to the rear end of the next adjacent cleat;

each cleat comprising a female and a male element, with the female element having a forward and a rear end; means forming a cavity within the rear marginal end of said female element, a forward marginal end of said male element being received within said cavity, a fastener means extending through the female and male elements so that a marginal length of the male element is pivotally received within the cavity of said female element to thereby enable the track means to be laterally bent;

steering means connected to alternate sides of alternate body sections to thereby simultaneously pivot each said body section laterally whereby successive marginal lengths of the track means are angled respective to one another and cause a change in course of the traveling vehicle.

2. The vehicle of claim 1 wherein said wheels include a drive wheel having a centrally located hub to which axially spaced rims and tires are affixed, a sprocket located between said rims by which the drive wheel imparts relative motion into the track means;

each cleat has spaced guides located inwardly of a rim engaging platform, and a drive lug which is engaged by a sprocket tooth so that when the drive wheel is rotated, the track means is forced to move longitudinally of the vehicle.

3. The vehicle of claim 1 wherein said body sections are pivotally connected at adjacent ends to permit lateral movement of each body section in a horizontal plane;

wherein said steering means includes a diagonal linkage having opposed ends with one end journaled to the forward body section, and the other end being journaled to an alternate body section, said journaled ends being located on opposed sides of the longitudinal centerline of the main body;

and a second diagonal linkage having opposed ends with one end being journaled to a body section adjacent to the forward body section and the other end journaled to the body section located rearwardly of the alternate body section; and a steering linkage connected to impart pivotal movement between said forward and said adjacent body sections, whereby the body sections each simultaneously pivot respective to one another.

4. The vehicle of claim 3 wherein said wheels include a drive wheel having a centrally located hub to which axially spaced rims are affixed, a sprocket located between said rims by which the drive wheel imparts relative motion into the track means;

each cleat has spaced guides located inwardly of a rim engaging platform, and a drive lug which is engaged by a sprocket tooth so that when the drive wheel is rotated, the track means is forced to move.

5. An all terrain vehicle having a single laterally bendable track which supports a vehicle main body by means of a plurality of track wheels;

said main body includes a plurality of body sections series connected together in a manner which admits pivotal movement in a horizontal plane between adjacent body sections;

a dual wheel for each body section, means by which ech body section is supported from said dual wheel; means by which said track is captured to said dual wheels;

steering means by which all body sections pivot simultaneously, thus bending the track laterally, and causing the vehicle to change course of travel;

said steering means includes a diagonal linkage means interconnecting alternate sides of alternate body sections; and means by which two adjacent body sections are caused to pivot respective to one another.

6. The vehicle of claim 5 wherein said wheels include a drive wheel, a prime mover connected to rotate said drive wheel;

said track comprises a plurality of adjacent cleats having a forward and a rear end, and series connected into an endless said track by pinning the forward end of one cleat to the rear end of the next adjacent cleat;

each cleat comprising a female and a male element, with the female element having a forward and a rear end; means forming a cavity within the rear marginal end of said female element, a forward marginal end of said male element being received within said cavity, a fastener means extending through the female and male elements so that a marginal length of the male element is pivotally received within the cavity of said female element to thereby enable the track to be laterally bent.

7. The vehicle of claim 5 wherein said wheels include a drive wheel having a centrally located hub to which axially spaced rims and tires are affixed, a sprocket located between said rims by which the drive wheel imparts relative motion into the track;

said track means comprises a plurality of adjacent cleats having a forward and a rear end, and series connected into an endless said track by pinning the forward end of one cleat to the rear end of the next adjacent cleat;

each cleat has spaced guides located inwardly of a rim engaging platform, and a drive lug which is engaged by a sprocket tooth so that when the drive wheel is rotated the track is forced to move longitudinally of the vehicle.

8. The vehicle of claim 5 wherein said body sections are pivotally connected at adjacent ends to permit lateral movement of each body section in a horizontal plane;

wherein said linkage means includes a diagonal linkage having opposed ends with one end journaled to a forward body section and the other end being journaled to an alternate body section, said journaled ends being located on opposed sides of the longitudinal centerline of the main body;

and another diagonal linkage having opposed ends with one end being journaled to a body section adjacent to said forward body section and the other end journaled to the body section located rearwardly of said alternate body section; and said steering means includes a steering linkage connected to impart pivotal movement between said forward and said adjacent body sections, so that the body sections each simultaneously pivot respective to one another.

9. The vehicle of claim 8 wherein said wheels include a drive wheel, and a prime mover connected to rotate said drive wheel.

10. A single track crawler vehicle comprising:

a main body, said main body includes a plurality of series connected adjacent body sections which present a longitudinally disposed vehicle, means by which said body sections ae individually pivoted respective to one another to laterally bend said main body;

a continuous, flexible track means; a plurality of wheels, there being a wheel for each said body section, means by which each said wheel supports part of said main body from said track means so that a continuous track is laid down for supporting said main body;

means driving one of said wheels so that said continuous track means is moved relative to said main body to cause the vehicle to travel along the terrain;

steering means connected to alternate sides of alternate body sections to simultaneously pivot each said body section laterally so as to angle successive marginal lengths of the track respective to one another, thus bending the track laterally to thereby cause a change in course of the traveling vehicle.

11. The vehicle of claim 10 wherein said body sections are pivotally connected at adjacent ends to permit lateral movement of each body section in a horizontal plane;

said steering means includes a diagonal linkage having opposed ends, with one end thereof journaled to a forward body section and the other end thereof journaled to an alternate body section, said journaled ends being located on opposed sides of the longitudinal centerline of the main body;

and another diagonal linkage having opposed ends with one end being journaled to a body section adjacent to said forward body section and the other end journaled to the body section located rearwardly of said alternate body section.

* * * * *